(12) United States Patent
Salamati

(10) Patent No.: US 6,608,461 B1
(45) Date of Patent: Aug. 19, 2003

(54) APPARATUS FOR REMOTELY CONTROLLING GEARED HEADS FOR MOTION PICTURE AND ELECTRONIC MEDIUM CAMERAS AND METHODS FOR USING SAME

(76) Inventor: Mehran Salamati, 22190 Saddle Peak Rd., Topanga, CA (US) 90290

( * ) Notice: Subject to any disclaimer, the term of this patent is extended or adjusted under 35 U.S.C. 154(b) by 0 days.

(21) Appl. No.: 09/887,409

(22) Filed: Jun. 22, 2001

Related U.S. Application Data

(60) Provisional application No. 60/213,365, filed on Jun. 23, 2000.

(51) Int. Cl.[7] ................................................ G05B 19/25
(52) U.S. Cl. ........................ 318/571; 318/572; 318/573; 352/53
(58) Field of Search ................................. 318/571, 572, 318/573; 352/53, 88, 197, 243; 700/85, 169; 348/373

(56) References Cited

U.S. PATENT DOCUMENTS

| 4,283,766 A | 8/1981 | Snyder et al. |
| 4,673,268 A | 6/1987 | Wheeler et al. |
| 4,710,819 A | 12/1987 | Brown |
| 4,720,805 A | 1/1988 | Vye |
| 4,847,543 A | 7/1989 | Fellinger |
| 4,959,798 A | 9/1990 | Gordon et al. |
| 5,220,848 A | 6/1993 | Basilico |
| 5,463,432 A | 10/1995 | Kahn |
| 5,465,144 A | 11/1995 | Parker et al. |
| 5,561,519 A | 10/1996 | Parker et al. |
| 5,644,377 A | 7/1997 | Romanoff et al. |
| 5,768,647 A | 6/1998 | Coffin et al. |
| 5,802,412 A | 9/1998 | Kahn |
| 5,835,193 A | 11/1998 | Romanoff et al. |
| 5,900,925 A | 5/1999 | Navarro |
| 6,027,257 A | 2/2000 | Richards et al. |

Primary Examiner—Khanh Dang
(74) Attorney, Agent, or Firm—Stout, Uxa, Buyan & Mullins, LLP; Donald E. Stout

(57) ABSTRACT

A two-axis or three-axis digitally controlled microprocessor for remotely controlling an existing manually operated geared head uses digital technology to provide full precise control of the geared head from a remote distance. Additionally, by utilizing the system's electronics, the system operator has ten gear ratios instead of the three gear ratios that typically exist in the prior art manual geared head. Another feature permits the camera operator to set four predetermined soft stop positions. The system has the capability of being able to record the X/Y/Z position precisely and to precisely duplicate the same camera motion repeatedly. The system is very simple and ergonomically advantageous to operate. One single umbilical cable between the controller and the geared head provides the most necessary communication between the controller and the geared head and supplies power to the camera.

28 Claims, 4 Drawing Sheets

APPARATUS FOR REMOTELY CONTROLLING GEARED HEADS FOR MOTION PICTURE AND ELECTRONIC MEDIUM CAMERAS AND METHODS FOR USING SAME

This application claims the benefit under 35 U.S.C. 119(e) of the filing date of Provisional Application Ser. No. 60/213,365, filed on Jun. 23, 2000.

BACKGROUND OF THE INVENTION

This invention relates to the fields of motion picture and video production, and more particularly to apparatus and methods for motorizing and remotely controlling, using a digitally controlled microprocessor, existing manually operated geared heads for positioning motion picture and electronic medium (such as video) cameras.

Prior art geared heads for positioning motion picture and electronic medium cameras are usually operated manually. When the cameraman needs to move the camera right to left (known in the art as "panning" the camera) or up and down (known in the art as "tilting" the camera), the operator will rotate two hand wheels, each controlling an axis. For example, if the cameraman needs to make a 180 degree pan, he has to physically travel 180 degrees behind the camera in an arc with the camera to view the shot through the viewing system.

Referring now to FIG. 1, there is shown therein a typical prior art geared head system 11. The illustrated geared head system 11 is sold under the trademark ARRIHEAD 2, available from Arri, Inc. However, it is merely representative, and any similar type of geared head assembly could alternatively be referenced. The geared head system 11 includes a camera platform 13, which is capable of adjustment in at least two axes, namely pan and tilt. A tilt handwheel 15 and a pan handwheel 17 are provided for use by the camera operator when it is desired to pan and/or tilt the camera (not shown) mounted on the platform 13. The camera platform 13 is disposed on a gearhead housing 19, within which reside a plurality of interengaged gears for selectively driving the camera platform, and thus the camera mounted thereon, through a predetermined range of motion in the pan and tilt axes. The gearhead housing 19 is supported by a plurality of legs 21.

Thus, in operation, the camera operator is stationed behind the gearhead housing 19, in position to actuate the two hand wheels 15 and 17, and to view the scene through the viewfinder of the camera (not shown). To pan or tilt the camera, the hand wheels 15 and 17 are selectively rotated. Since the hand wheels 15 and 17 are drivingly connected to the interengaged gears via a manual tilt gear drive interface and a manual pan gear drive interface, respectively, rotation of the hand wheels 15 and 17 functions to drive the gears within the gearhead housing 19, which in turn are drivingly engaged with the camera platform 13. In other words, the hand wheels 15 and 17 are mechanically linked to the platform 13 so that a ratio of turns will be converted into movement, through the gearhead, in the tilt axis and the pan axis, respectively. In some embodiments (not shown), a third hand wheel or motor is provided which rotates the camera on a roll axis. There is no ability to provide predetermined fixed stops in pan, and in tilt, only the end of the permitted travel arc provides a hard stop. No intermediate stops may be selected.

Most existing geared heads have three mechanical gear ratios which enable the camera operator to choose the rate at which he would like to move the photographic device. Unfortunately, this limited selection of travel speeds can be very restrictive during a shoot.

With a conventional geared head, it is very difficult to move the camera rapidly and stop on a precise mark. Generally, since the operator cannot see beyond the viewing system when the final mark will be approaching, it is possible to either go beyond the final mark or to fail to reach the final mark. Geared heads for motion picture and electronic medium cameras were designed to assist the camera operator's ability to pan or tilt the camera from point A to point B with a greater degree of accuracy than was previously possible, in order to accommodate the ever more complex shots required in an increasingly sophisticated and demanding industry, but their present limitations continue to frustrate both camera operators and directors.

Presently available geared heads have virtually infinite panning ability, but are generally restricted to +/- approximately 30 degrees in tilt. It is possible, therefore, for the operator to reach a hard mechanical stop on the tilt axis during photography, which is unacceptable in most cases.

Additionally, because present motion picture geared heads are operated manually, it is possible to move the camera the same way multiple times, but never to replicate a previous camera move exactly.

Still another problem with existing geared head assemblies is the necessity for the camera operator to be positioned directly behind the assembly. Often, the camera must be placed in a relatively hazardous orientation in order to obtain an acceptable shot, and this entails danger and inconvenience to the operator. Although remote controlled cameras are presently available for such occasions, they are generally very expensive and relatively complex, and are not adaptable to typical geared head assemblies, thereby entailing a time consuming and complex "change-out" operation, or a separate camera assembly for those unique shots.

Various prior art systems have been developed for providing remotely controlled camera systems, particularly for ensuring repeatable shots and for permitting hazardous shoots without placing a camera operator in harm's way. For example, U.S. Pat. No. 4,673,268 discloses a remote camera operation system comprising pan and tilt tables which are each actuatable by respective stepper motors. These tables may be computer controlled for repeatable shot sequences. However, this system is not adaptable for use with existing gear heads.

U.S. Pat. No. 4,720,805 discloses a computer-controlled camera system for controlling pan and tilt motors remotely using a digitizing tablet. However, again, this system is not adaptable for use with existing gear heads.

U.S. Pat. No. 4,847,543 discloses a remote-controlled camera system which uses control handles similar to those used in certain manual systems to actuate pressure transducers, which convert the movements of the handles initiated by the camera operator to voltage signals for actuating pan and tilt motors at the camera. The purpose of this arrangement is to facilitate repeatability of camera operation. This is not a remote system, but rather requires the operator to be located at the camera location.

U.S. Pat. No. 5,220,848 discloses a remote camera operation system wherein handwheels are used to operate a prior art cine head, which has a video monitor instead of a camera mounted thereon. Sensors transmit signals to a central control unit, based upon movements initiated by the camera operator on the handwheels, thereby actuating step or stepless actuator head motors. This system is disadvantageous, however, in that it is a complex customized approach not readily adaptable for quick change-out and use with existing gear heads.

Therefore, it would be highly desirable to have a geared head assembly which is directly adaptable to existing geared heads, is simple and quick to change out, affords a substantially greater number of mechanical gear ratios to select from, in order to provide the camera operator with an increased range of pan and tilt speeds, is programmable to provide selectable soft stops in both the pan and tilt axes, and is capable of recording a complex move so that it can be repeated precisely as many times as desired.

SUMMARY OF THE INVENTION

The present invention solves the aforementioned problems by providing a two-axis or three-axis digitally controlled microprocessor for remotely controlling an existing manually operated geared head. Because of the digital technology, the camera operator has full precise control of the geared head from a remote distance, as if he or she were physically behind the geared head personally.

Additionally, by utilizing the inventive system's electronics, the operator has, in one preferred embodiment, ten gear ratios instead of the three gear ratios that typically exist in the prior art manual geared head. Also, three out of the ten speeds are matched with the standard geared head to emulate standard gearing on conventional geared heads. The additional seven gear ratios give the camera operator the ability to control the geared head speed by increasing or decreasing the speed from conventional choices.

Another advantage of the present invention permits the camera operator to set four predetermined soft stop positions, in one preferred embodiment. With the ability to set soft stop positions, the camera operator is guaranteed that he will never exceed the final position on either axis. For example, if a stunt person jumps from a platform into a stunt safety bag, the camera operator will take the camera, find the final position, and mark that position before photographing it. During photography, the electronics remember precisely where the mark is, and ensure that the camera will stop at that predetermined mark. The aforementioned stops are "soft stops" because, regardless of how fast the operator moves the camera, the device ensures that the camera comes to a very soft and gentle stop.

Still another important feature of the present invention is that, because a standard motion picture geared head is utilized, with its limited tilt capability, the mechanical limits positions on the tilt axis are calibrated and recorded. As a result, the tilt axis may be feathered and stopped before the geared head reaches its mechanical limits in the up and down position, thus creating a soft stop for the tilt axis.

The inventive system has the capability of being able to record the X/Y/Z position precisely and to precisely duplicate the same camera motion repeatedly. The system is very simple and ergonomically advantageous to operate. One single umbilical cable between the controller and the geared head provides the most necessary communication between the controller and the geared head and supplies power to the camera.

More particularly, in one aspect of the invention there is provided a system for remotely controlling geared heads for motion picture and electronic medium cameras. Advantageously, the system comprises an electronic interface for attachment to an existing geared head for a motion picture or electronic medium camera. The system additionally comprises a tilt motor assembly mechanically attachable to the geared head and electronically attachable to the electronic interface, and a pan motor assembly which is also mechanically attachable to the geared head and electronically attachable to the electronic interface. A control console is electronically attachable to the electronic interface, which control console comprises a tilt motor input control and a pan motor input control.

In order to provide the remote operational capabilities of the inventive system, the control console is physically spaced from the geared head when the system is in an operating configuration.

In a preferred embodiment of the invention, the system further comprises a record/playback module, as well as a video monitor for use with the control console. The tilt motor input control and the pan motor input control each comprise a handwheel, preferably the handwheels which were originally attached to the geared head. This is advantageous in order to minimize any adaptations necessary on the part of the camera operator. The tilt motor assembly comprises a shaft for engagement with the tilt drive gear mechanism of the existing geared head, while the pan motor assembly comprises a shaft for engagement with the pan drive gear mechanism of the existing geared head.

In another aspect of the invention, there is provided an apparatus for electronically controlling geared heads for motion picture and electronic medium cameras, which comprises a tilt motor assembly attached to the geared head and a pan motor assembly attached to the geared head. Additionally, the apparatus comprises a system for establishing soft stops for limiting the pan and tilt travel of the geared head, which comprises software and a plurality of control inputs for actuation by an operator. A plurality of control inputs are disposed on a control panel and each of the control inputs operates to establish a soft stop for the geared head in one direction of travel. The soft stops are established by first moving the geared head to desired travel limits so that the computer software learns those limits.

In yet another aspect of the invention, there is provided a system for controlling geared heads for motion picture and electronic medium cameras, which comprises a geared head for controlling the movement of a camera attached thereto in the pan and tilt directions. A tilt motor assembly and a pan motor assembly are each attached to the geared head. Additionally, a control console is attached to the tilt motor assembly and the pan motor assembly. The control console is physically spaced and separate from the geared head and comprises a tilt motor input control and a pan motor input control.

In another aspect of the invention, there is disclosed a method of converting an existing manual geared head for a motion picture or electronic medium camera to a remotely controlled motorized gear head. The method comprises steps of replacing manual control inputs for pan and tilt gear mechanisms in the existing geared head with motorized control inputs, and a further step of attaching a control console to the motorized control inputs.

In still another aspect of the invention, there is disclosed a method of setting soft stops for limiting the range of motion of geared heads for motion picture and electronic medium cameras in the pan and/or tilt directions. The inventive method comprises a step of moving the geared head to its desired final position in any direction while depressing a soft stop control switch corresponding to that direction, and a further step of memorizing the desired final position using software adapted for such a purpose.

The invention, together with additional features and advantages thereof, may best be understood by reference to the following description taken in conjunction with the accompanying illustrative drawing.

DESCRIPTION OF THE PREFERRED EMBODIMENT

Figure 1:
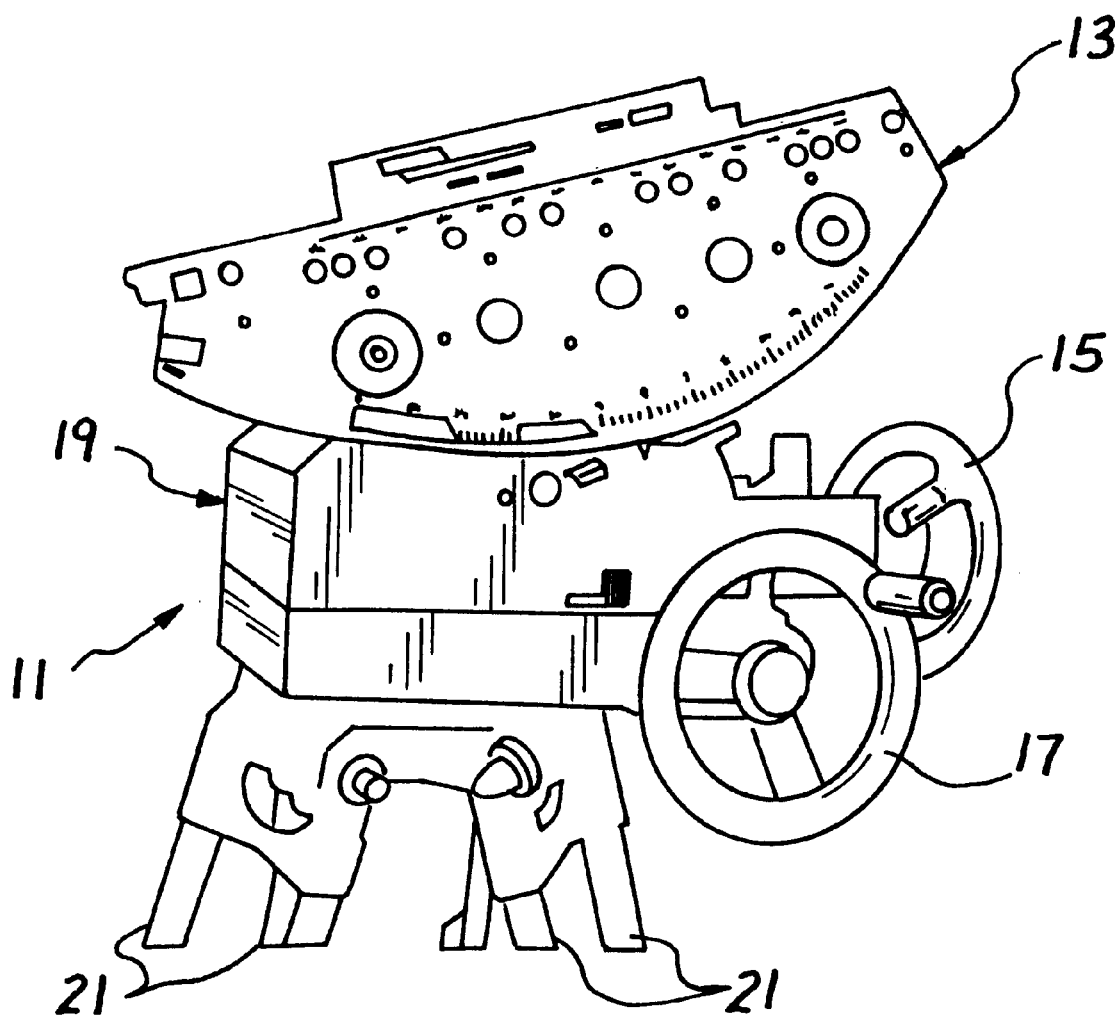
FIG. 1 is an elevational view of a prior art geared head assembly for use with motion picture and electronic medium cameras.

Now with particular reference to FIGS. 2 through 4, a preferred embodiment of the inventive system for remotely controlling a motion picture geared head, such as the geared head system 11 shown in FIG. 1, will be described. Those elements which are equivalent to elements shown in FIG. 1 are designated by like reference numerals, preceded by the numeral 1.

Figure 4:
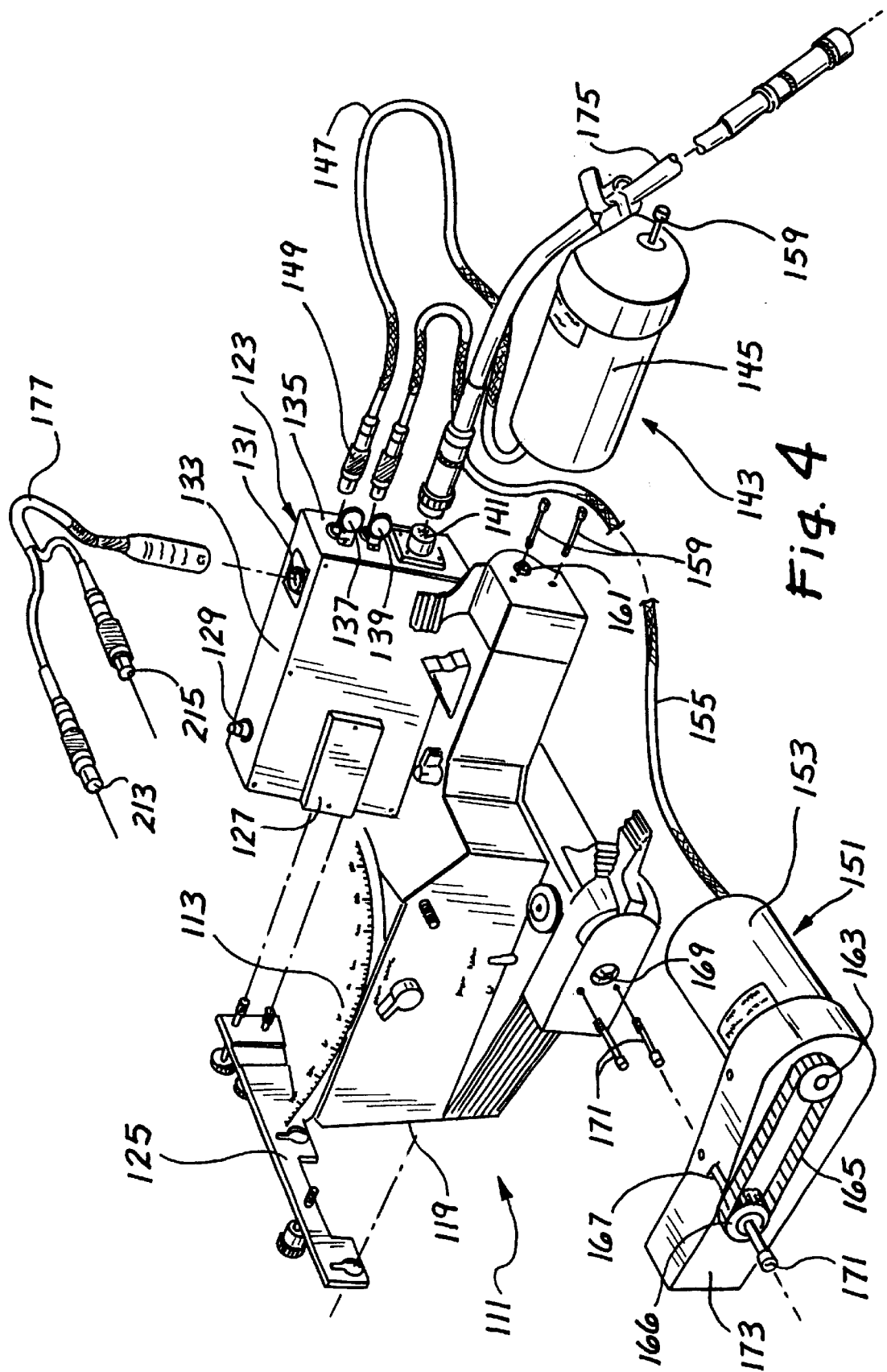
FIG. 4 is a perspective exploded view of a prior art geared head which has been modified to include the inventive system.

Thus, as illustrated in FIG. 4, a first portion 111a of a geared head system is constructed in accordance with the principles of the present invention and includes a camera platform 113, upon which a camera (not shown) may be mounted. In the preferred embodiment, the camera platform is from a system such as system 11 shown in FIG. 1, available under the trademark ARRIHEAD, from Arri, Inc. Other existing geared head systems may alternatively be adapted to result in inventive system 111, however, such as, for example, the system available under the trademark PANAHEAD, from Panavision, Inc. The camera platform 113 is disposed on a gearhead housing 119, which is preferably from the existing system 11 as well.

To modify the prior art system 11 into the inventive system 111, an electronic interface or signal split box 123 is provided which is attachable to the gearhead housing 119 using a signal split box bracket 125 and a signal split box receiving bracket 127, or other suitable means. The signal split box 123 includes thereon a calibrate switch 129 and a camera remote and power output jack 131 on a top surface 133 thereof. On a rear surface 135 of the signal split box 123 are disposed a tilt motor output connector 137, a pan motor output connector 139, and an umbilical signal input 141. A tilt motor assembly 143 comprises a tilt motor 145. Attached to the tilt motor 145 is a tilt motor cable 147 and output connector 149.

Also provided as a part of the system 111 is a pan motor assembly 151, which includes a pan motor 153. Attached to the pan motor 153 is a pan motor cable 155 and output connector 157.

The tilt motor 145 is attached to the gearhead housing 119 by means of attachment screws 159. Initially, the tilt hand wheel 15 (FIG. 1) is removed (disengaged) from the hub 161 (and specifically the manual tilt gear drive interface) and set to the side for the moment. Then, the tilt motor drive shaft (not shown) is engaged with the manual tilt gear drive interface associated with the hub 161, in the same manner as the tilt hand wheel shaft was previously engaged, so that the tilt motor can rotate the tilt drive gear mechanism within the housing 119, thereby permitting the operator to control the movement of the camera on the tilt axis. Then the screws 159 are inserted into the provided registered mounting holes and tightened to secure the tilt motor 145 on the housing.

Both the pan and tilt motors, in the preferred embodiment, are servo motors available from Pittman, Inc.

In the preferred embodiment, both the pan motor drive shaft 163 and the tilt motor drive shaft do not directly engage the pan or tilt drive gear mechanisms, respectively, within the housing 119. The preferred drive system is illustrated with respect to the pan motor, and it will be understood that this system, though not illustrated in the drawing, is preferred for, the tilt motor as well. In particular, a timing belt 165 is supplied which is connected between the drive shaft 163 and a timing pulley 166 which is associated with a gearhead coupling 167. Initially, the pan hand wheel 17 (FIG. 1) is removed (disengaged) from the hub 169 (and specifically the manual pan gear drive interface) and set to the side for the moment. Then, the gearhead coupling 167 is engaged with the manual pan gear drive interface associated with the hub 169, in the same manner as the pan hand wheel shaft was previously engaged, so that the pan motor can rotate the pan drive gear mechanism within the housing 119, thereby permitting the operator to control the movement of the camera on the pan axis. Then, the screws 171 are inserted into the provided registered mounting holes and tightened to secure the pan motor 153 on the housing. A cover for the timing belt and gearhead coupling arrangement is preferably provided, for appearance as well as protection of the drive mechanism components.

An umbilical cable 175 is coupled to the umbilical signal input, and a camera power and remote cable 177 is coupled to the camera power and remote output jack 131 for reasons that will become clear hereinbelow.

Figure 2:
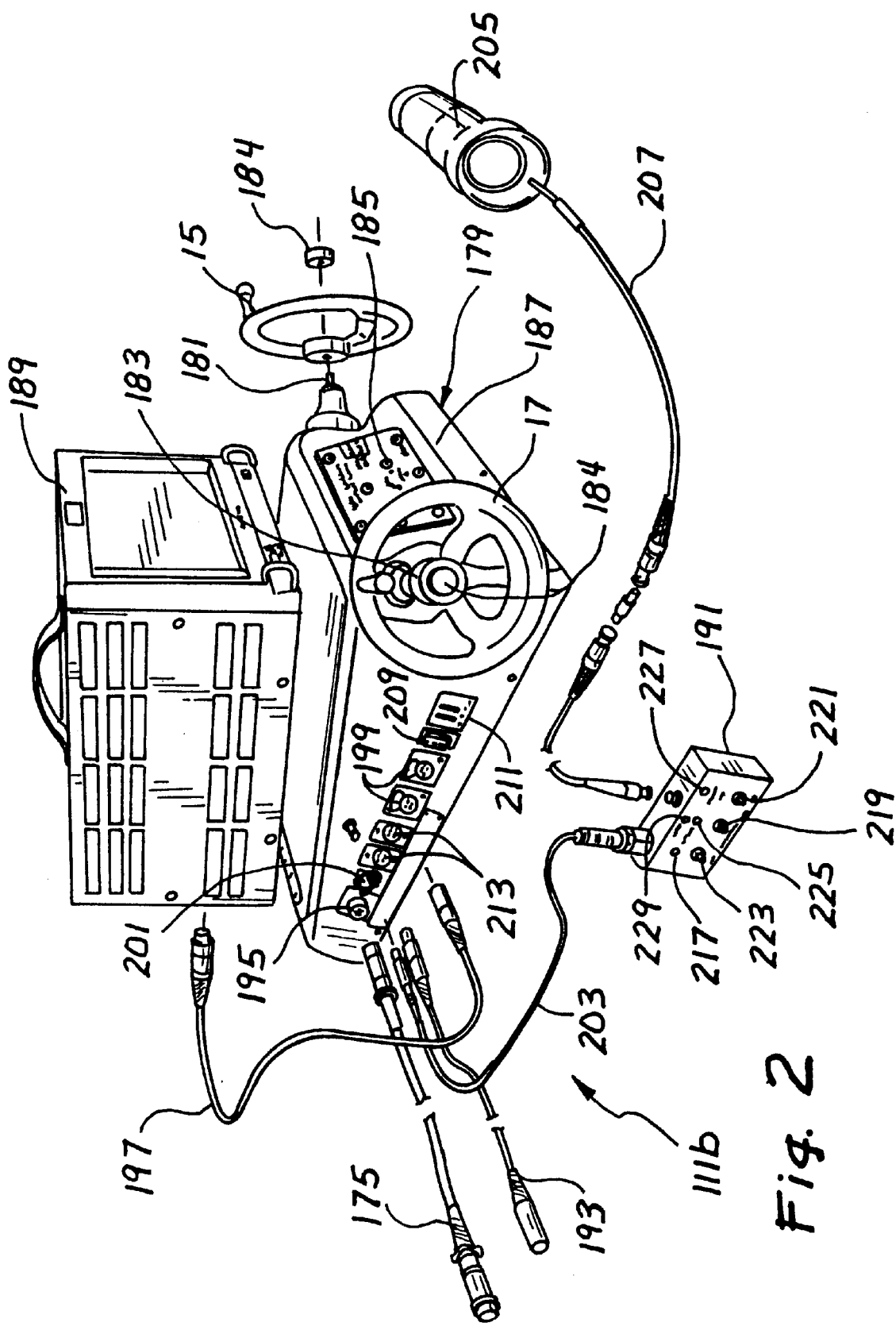
FIG. 2 is a perspective view of the control console and video monitor which form a part of a preferred embodiment of the inventive system.

Now referring particularly to FIG. 2, the remainder 111b of the inventive geared head system is illustrated. A control console 179 is provided, which may advantageously be placed at a selected location spaced from the location of the camera and gearhead housing 119, so that the operator need not be placed at safety risk or in an uncomfortable situation. The control console 179 includes a tilt input/receiver 181 and a pan input/receiver 183. The tilt hand wheel 15 from the original prior art system 11, which was previously set aside, is installed onto the tilt input/receiver 181 using a hand wheel attachment screw 184. Similarly, the pan hand wheel 17 is installed onto the pan input/receiver 183 using a second hand wheel attachment screw 184. A control panel 185, which will be discussed in greater detail in connection with FIG. 3, is disposed on a front face 187 of the control console 179. Atop the control console 179 is disposed a video monitor 189, though, since it is a separate element, it may be placed in any desired location, including locations remote from the control console 179. The system 111 also includes a record/playback module 191.

A power cable 193 is connected to the control console 179 for providing electrical power to the system 111. The umbilical cable 175 is connected to the console 179 via a jack 195, for providing a control signal from the control console 179 to the signal split box 123 (FIG. 4). A video monitor cable 197 is connected between a 12 volt output 199 on the control console 179 and the video monitor 189. The record/playback module 191 is attached to the control console 179 at jack 201 via cable 203. A bloop light 205 may be attached to the record/playback module 191 via a cable 207.

The control console 179 further preferably includes a PC output jack 209 and handwheel reversing switches 211, and a camera power input 213, to which are attached the distal ends 213, 215 of the camera power and remote cable 177 (FIG. 4). The record/playback module 191 includes thereon a record switch 217, a playback and first position switch 219, a stop switch 221, a record indicator 223, a playback indicator 225, a memory occupied indicator 227, and a first position indicator 229.

Figure 3:
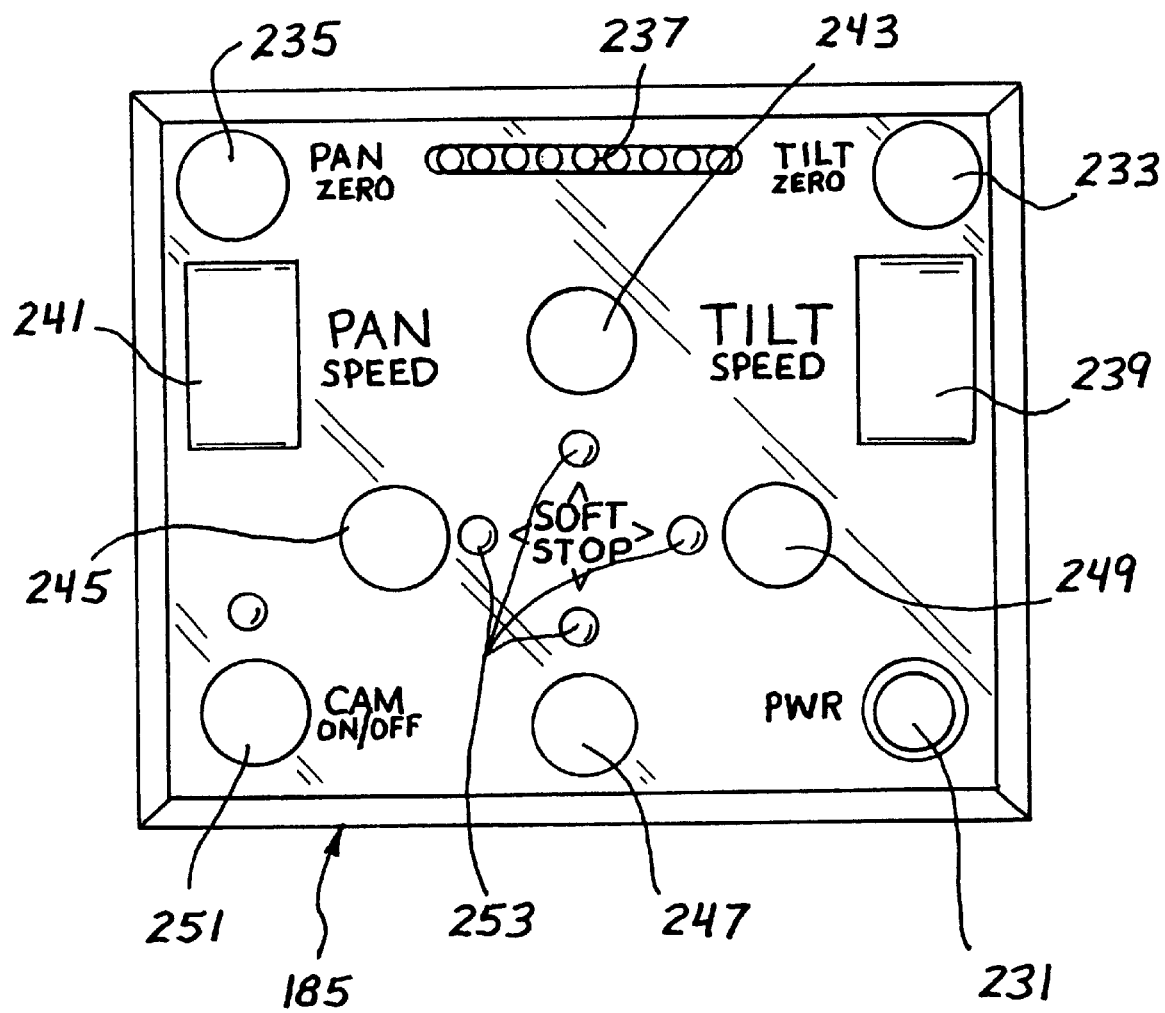
FIG. 3 is an elevational enlarged view of the control panel shown in FIG. 2 for the inventive system, which is disposed on the control console.

Now with particular reference to FIG. 3, an enlarged version of the control panel 185 of FIG. 2 is illustrated. On the panel 185 are disposed a power switch and circuit breaker 231, a tilt on/off switch 233, a pan on/off switch 235, a voltage monitor 237, a tilt gear speed selector 239, a pan gear speed selector 241, an upper soft stop switch 243, a left soft stop switch 245, a lower soft stop switch 247, a right soft stop switch 249, a camera on/off switch 251, and LED status indicators 253.

In operation, once all of the system components have been attached, as described supra, the system is activated by turning on the power switch and circuit breaker 231 on the control panel 185 (FIG. 3). The voltage monitor 237 will indicate the condition of voltage to the system. This will supply power to the entire system and will show four blinking status lights 253. The hand wheels 15, 17 are disabled for safety at this juncture until a crewman installs the camera (not shown) on the geared head platform 113 and presses and holds the calibrate switch 129. The calibration function causes the control system to turn on the tilt motor 145 and to tilt the camera platform 113, and thus the camera, down at a fractional percent of its power to reach the mechanical stop on the down position. Then, after reaching the stop, corresponding to the end position, the tilt motor reverses direction at the same power setting to the extreme tilt up position. At this point, using software provided in the control console 179, the control system has learned the physical limitations of the tilt axis of the geared head. Now, the camera operator lets go of the calibration switch 129. Once the calibration process is completed, the power to the servo motors is returned to full power.

The function of the calibration switch is twofold. First, as described supra, it serves to permit the control system to learn the physical tilt limitation of the actual tilt access of the particular system being utilized, which varies from geared head to geared head. Secondly, it serves as a "dead man's switch". To amplify, because the geared system 111 is transformed into a remote system by virtue of the inventive system, there is a safety issue regarding the possibility of the controller potentially being out of the visual range of the actual geared head during initial set-up and during some shoots. During set-up, the technician "camera assistant" is able to attach the camera and accessory to the geared head without the danger of the system moving without his or her knowledge. After the technician has completed his or her duties by installing the camera and accessories, he or she can then press the "calibrate" button which will enable the controller to start to calibrate the tilt axis and to allow the operator to control the geared head from a remote distance. The possibility exists that one operator may be turning the wheels while another technician is trying to connect the camera to the geared head. This necessitates the aforementioned "dead man's switch".

By selecting desired settings of the tilt gear speed selector 239 and the pan gear speed selector 241, the operator is able to select his desired gear ratios between the hand wheels and the geared head. The camera can be turned on or off using the camera on/off switch.

If soft stops, as discussed supra, are desired in either axis, before photographing, the camera operator will move the camera to its desired final position by pressing the appropriate button or switch 243, 245, 247, or 249 until the camera has achieved the desired final position in that direction. The controller software will learn that limit. Then, subsequently, during photography, if the camera operator turns the corresponding hand wheel 15, 17 beyond the desired stop position, the controller will take over and ease to a complete stop at the preset soft stop limit regardless of the hand wheel position. This feature ensures that the camera never travels beyond the marked position and also avoids an unacceptable hard stop by feathering the camera to a soft stop.

To utilize the record/playback function of the invention, the camera operator moves the camera to its starting position by moving the hand wheels 15, 17 as appropriate. By pressing the record switch 217, the record indicator 223 is activated, and the recording of the memory begins. When the camera is moved to the end position using the hand wheels 15, 17, the stop switch 221 is pressed, which stores the move in the volatile memory of the controller. The memory occupied indicator 227 lights to indicate that a move has been stored in the memory. Another move cannot be recorded until the memory has been erased, by pushing the stop switch 221 and the record switch 217 simultaneously. To play back the memory, the playback switch 219 is depressed. The controller then automatically moves the camera to its beginning position and the first position indicator light 229 comes on. At this point, the controller stands by for the camera operator to press the playback switch 219 a second time to repeat the move. By pressing the playback switch, the playback indicator light 225 is activated, and the controller plays back the move in its entirety.

In one presently preferred embodiment, the inventive system is approximately 18 inches by 10.5 inches by 5 inches and weighs approximately eight pounds. The maximum current draw is about 4 amps, and the power requirement is 24 to 36 VDC.

Although in the foregoing description, the focus has been on modification of existing geared heads to permit remote operation thereof in two axes, pan and tilt, the principles of this invention extend easily to remote operation in a third axis, namely, the roll axis. The modification methods discussed herein in connection with the pan and tilt axes apply as well with respect to the roll axis, in that the general procedure is to remove the existing means for actuating the camera in the roll axis, through the geared head, and to replace that means, which may be either a handwheel or a motor, with a roll motor assembly similar to both of the pan motor and tilt motor assemblies, and to connect the roll motor assembly electronically to the control console through the signal split box.

Accordingly, although an exemplary embodiment of the invention has been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A system for converting manually controlled geared heads for motion picture and electronic medium cameras to remotely controlled geared heads, comprising:

an electronic interface for attachment to an existing geared head for a motion picture or electronic medium camera, wherein the existing geared head comprises a manual pan gear drive interface and a manual tilt gear drive interface;

a tilt motor assembly mechanically attachable to the geared head through said manual tilt gear drive interface and electronically attachable to the electronic interface, said tilt motor assembly comprising a handwheel;

a pan motor assembly mechanically attachable to the geared head through said manual pan gear drive interface and electronically attachable to the electronic interface, said pan motor assembly comprising a handwheel; and a control console electronically attachable to said electronic interface, said control console comprising a tilt motor input control and a pan motor input control.

2. The system as recited in claim 1, wherein said control console is physically spaced from said geared head when said system is in an operating configuration.

3. The system as recited in claim 1, and further comprising a record/playback module.

4. The system as recited in claim 1 and further comprising a video monitor for use with said control console.

5. The system as recited in claim 1, wherein said handwheels are handwheels which were originally attached to said geared head through each of said manual pan gear drive interface and said manual tilt gear drive interface, respectively, such that the existing geared head was manually controllable by said handwheels in pan and tilt.

6. The system as recited in claim 1, and further comprising control inputs for establishing soft stops for limiting the pan and tilt motions of the geared head.

7. The system as recited in claim 6, wherein said control inputs for establishing soft stops includes software and a plurality of switches on said control console.

8. The system as recited in claim 1, wherein said tilt motor assembly comprises a shaft for engagement with the manual tilt gear drive interface of the existing geared head.

9. The system as recited in claim 1, wherein said pan motor assembly comprises a shaft for engagement with the manual pan gear drive interface of the existing geared head.

10. Apparatus for converting manually controlled geared heads for motion picture and electronic medium cameras to electronic remotely controlled geared heads, comprising:

a tilt motor assembly attached to a manual tilt drive interface of a geared head;

a pan motor assembly attached to a manual pan drive interface of the geared head; and a system for establishing soft stops for limiting the pan and tilt travel of said geared head, said system comprising software and a plurality of control inputs for actuation by an operator.

11. The apparatus as recited in claim 10, wherein said plurality of control inputs are disposed on a control panel and each of said control inputs operates to establish a soft stop for the geared head in one direction of travel.

12. The apparatus as recited in claim 11, wherein said soft stops are established by first moving the geared head to desired travel limits so that the computer software learns those limits.

13. A system for controlling geared heads for motion picture and electronic medium cameras, comprising:

a geared head for controlling the movement of a camera attached thereto in the pan and tilt directions, said geared head comprising a tilt drive gear mechanism having an interface for engaging a first handwheel adapted to manually actuate said tilt drive gear mechanism, and a pan drive gear mechanism having an interface for engaging a second handwheel adapted to manually actuate said pan drive gear mechanism;

a tilt motor assembly attached to the tilt drive gear mechanism in place of the first handwheel;

a pan motor assembly attached to the pan drive gear mechanism in place of the second handwheel; and a control console attached to said tilt motor assembly and said pan motor assembly, said control console being physically spaced and separate from said geared head and comprising a tilt motor input control and a pan motor input control.

14. The system as recited in claim 13, and further comprising a video monitor for use with said control console.

15. The system as recited in claim 13, wherein said tilt motor input control and said pan motor input control each comprise a handwheel.

16. The system as recited in claim 13, and further comprising control inputs for establishing soft stops for limiting the pan and tilt motions of the geared head.

17. The system as recited in claim 16, wherein said control inputs for establishing soft stops includes software and a plurality of switches on said control console.

18. A method of converting an existing manual geared head for a motion picture or electronic medium camera to a remotely controlled motorized geared head, comprising:

a) replacing manual control inputs for pan and tilt gear mechanisms in said geared bead with motorized control inputs; and b) attaching a control console to said motorized control inputs.

19. The method as recited in claim 18, wherein said manual control inputs comprise hand wheels operably attached to said geared head through a manual pan gear drive interface and a manual tilt gear drive interface, respectively.

20. The method as recited in claim 18, wherein said motorized control inputs comprise a pan motor assembly and a tilt motor assembly, respectively.

21. The method as recited in claim 18, wherein said attaching step comprises attaching said control console to an electronic interface, which is, in turn, attached to said motorized control inputs.

22. The method as recited in claim 18, and Her comprising setting soft stops for limiting the range of motion of said geared head in the pan and/or tilt direction by:

c) moving the geared head moving the geared head to its desired final position in any direction while depressing a soft stop control switch corresponding to that direction; and d) memorizing said desired final position using software adapted for such a purpose.

23. A method of converting an existing manual geared head for a motion picture or electronic medium camera to a remotely controlled motorized geared head, comprising:

a) disabling inputs for manually controlling pan and tilt gear mechanisms in said geared head;

b) attaching motorized pan and tilt control inputs to said geared head; and c) attaching a control console to said motorized pan and tilt control inputs.

24. The method as recited in claim 23, wherein said disabling step comprises removing said inputs for manually controlling said pan and tilt gear mechanisms.

25. The method as recited in claim 24, wherein said inputs comprise hand wheels.

26. The method as recited in claim 25, and further comprising a step of attaching said hand wheels to said control console for remotely controlling pan and tilt, respectively, through said motorized pan and tilt control inputs.

27. The method as recited in claim 23, wherein said motorized pan and tilt control inputs comprise, respectively, a pan motor assembly and a tilt motor assembly.

28. The method as recited in claim 23, wherein said control console attaching step further comprises electronically attaching an electronic interface to said motorized pan and tilt control inputs, and electronically attaching said electronic interface to said control console.

\* \* \* \* \*

UNITED STATES PATENT AND TRADEMARK OFFICE
CERTIFICATE OF CORRECTION

PATENT NO.    : 6,608,461 B1                                              Page 1 of 1
DATED         : August 19, 2003
INVENTOR(S)   : Mehran Salamati It is certified that error appears in the above-identified patent and that said Letters Patent is hereby corrected as shown below:

Column 10,
Line 25, after "geared" change "bead" to -- head --.
Line 40, after "and" change "Her" to -- further --.
Line 43, change "c)" to -- a) --.
Line 47, change "d)" to -- b) --.

Signed and Sealed this

Thirteenth Day of April, 2004

JON W. DUDAS
*Acting Director of the United States Patent and Trademark Office*